(12) United States Patent
Eduarde

(10) Patent No.: US 11,971,133 B2
(45) Date of Patent: Apr. 30, 2024

(54) WIDTH-ADJUSTABLE SUPPORT STAND

(71) Applicant: Henry Eduarde, Nanaimo (CA)

(72) Inventor: Henry Eduarde, Nanaimo (CA)

(73) Assignee: IronBrander Corporation

( * ) Notice: Subject to any disclaimer, the term of this patent is extended or adjusted under 35 U.S.C. 154(b) by 0 days.

(21) Appl. No.: 18/157,447

(22) Filed: Jan. 20, 2023

(65) Prior Publication Data
US 2023/0341081 A1 Oct. 26, 2023

Related U.S. Application Data

(60) Provisional application No. 63/333,240, filed on Apr. 21, 2022.

(51) Int. Cl.
| | | |
|---|---|---|
| *F16M 11/24* | (2006.01) | |
| *A47G 7/04* | (2006.01) | |
| *F16M 11/22* | (2006.01) | |
| *F16M 11/34* | (2006.01) | |
| *F16M 11/26* | (2006.01) | |

(52) U.S. Cl.
CPC ............. *F16M 11/22* (2013.01); *A47G 7/041* (2013.01); *F16M 11/242* (2013.01); *F16M 11/26* (2013.01); *F16M 11/34* (2013.01); *F16M 2200/025* (2013.01)

(58) Field of Classification Search
CPC ...... F16M 11/242; F16M 11/26; F16M 11/30; F16M 11/32; F16M 11/34; A47B 13/003
USPC .................. 248/163.1, 163.2, 164, 431, 432; 108/158.12, 153.1, 157.1, 157.17, 137
See application file for complete search history.

(56) References Cited

U.S. PATENT DOCUMENTS 5,653,179 A 8/1997 Kendall
8,348,071 B1 * 1/2013 Janlert .................... F16M 11/32
211/175

(Continued)

FOREIGN PATENT DOCUMENTS

| | | |
|---|---|---|
| CA | 2841208 | 10/2014 |
| CN | 101418900 | 3/2011 |
| WO | 9517282 | 6/1995 |

OTHER PUBLICATIONS

Buy dog bowl stand; Ubuy; https://www.ubuy.sk/en/product/ZPMP984l-dog-stand-for-large-dogs-adjustable-width-holds-8 . . . .

Primary Examiner — Alfred J Wujciak
(74) Attorney, Agent, or Firm — Kyle R Satterthwaite; Ryan W Dupuis; Ade & Company Inc.

(57) ABSTRACT

A width-adjustable support stand has two leg pairs, each composed of two legs interconnected by a length-adjustable cross-rail. Each cross-rail features a pair of rail stubs that are attached to inner sides of the two legs and are telescopically received in hollow cavities of a rail hub at opposing ends thereof. Each rail stub has a pair of slide guides engaged with corresponding slide guides on opposing internal walls of the respective hollow cavity, and also has upper and lower tongues riding in top and bottom slots of the rail hub between in-turned flanges thereof. To lock each leg pair at user-selected width, a lock slot in each rail stub is penetrated by a lock fastener that engages opposing sidewalls of the rail hub on opposite sides of the rail stub, so that tightening of the fastener clamps the rail stub firmly between the sidewalls of the rail hub.

9 Claims, 9 Drawing Sheets

(56) References Cited

U.S. PATENT DOCUMENTS

| | | | |
|---|---|---|---|
| 8,827,232 B2* | 9/2014 | Crowley | A47B 43/003 248/676 |
| D744,173 S | 11/2015 | Jones et al. | |
| 10,208,777 B1 | 2/2019 | Brassard | |
| D873,503 S | 1/2020 | MacNeil et al. | |
| 2014/0075980 A1* | 3/2014 | Villar | F24F 13/32 62/297 |
| 2015/0320221 A1* | 11/2015 | Williams | A47C 7/62 248/188.5 |
| 2019/0346079 A1* | 11/2019 | Carter, Sr. | F16M 11/041 |

* cited by examiner

WIDTH-ADJUSTABLE SUPPORT STAND

FIELD OF THE INVENTION

This application relates generally to stands for supporting potted plants, pet food bowls or other objects, and more particularly to a width-adjustable support stand that is expandable and collapsible in width to accommodate different sizes of such objects.

BACKGROUND

A known type of width-adjustable support stand features four legs that are connected in opposing pairs by two cross-rails that intersect at a center of the stand. Each rail is a multi-piece assembly having a central hub mated with the central hub of the other rail in perpendicularly cross-wise relation thereto, and a pair of rail stubs affixed to the two legs of the corresponding leg pair and slidably received in opposing ends of the central hub. Each rail stub has pair of protruding male guides on opposing sides thereof, which are received in a pair of corresponding female slots in the interior walls of the hub. Pulling apart of the two legs of any rail-connected pair pulls the respective rail stubs further out from the cross-rail's central hub, thereby expanding the width of the stand in a width direction thereof spanned by that cross-rail. Pushing the two legs of any rail-connected pair back toward one another pushes the respective rail stubs further back into the cross-rail's central hub, thereby reducing the width of the stand in that direction. Breakage of the male guides in these prior designs is known to occur, based on which applicant has recognized a need for a stronger, more robust design for such width-adjustable stands.

SUMMARY OF THE INVENTION

According to a first aspect of the invention, there is provided a width-adjustable support stand comprising:
  a first leg pair comprising a first leg and a second leg, and a second leg pair comprising a third leg and a fourth leg, each of said legs having an inner side that faces toward a center axis of the support stand, wherein a center of the first leg pair and a center of the second leg pair are intersect at the center axis of the stand, and an opposing outer side that faces outwardly away from the center axis of the support stand;
  a first cross-rail spanning between the first and second legs of the first leg pair, said first cross-rail comprising a first rail stub attached to the inner side of the first leg, a second rail stub attached to the inner side of the second leg, and a first rail hub having first and second hollow cavities in which the first and second rail stubs are telescopically received at opposing ends of said first rail hub;
  a second cross-rail spanning between the third and fourth legs of the second leg pair, said second cross-rail comprising a third rail stub attached to the inner side of the third leg, a fourth rail stub attached to the inner side of the fourth leg, and a second rail hub having third and fourth hollow cavities in which the third and fourth rail stubs are telescopically received at opposing ends of said second rail hub;
  wherein each rail stub has a pair of slide guides on opposing sides thereof that respectively engage with a corresponding pair of slide guides on opposing internal walls of the respective hollow cavity, each rail stub has an upper male tongue running along a topside of the rail stub and a lower male tongue running along an underside of the rail stub, the upper male tongue of each one of the rail stubs is received in an open upper slot of one of the rail hubs that runs along a topside thereof between a pair of in-turned top flanges of said one of the rail hubs, and the lower male tongue of said each one of the rail stubs is received in an open lower slot of said one of the rail hubs that runs along an underside thereof between a pair of in-turned bottom flanges of said one of the rail hubs.

According to a second aspect of the invention, there is provided a width-adjustable support stand comprising:
  a first leg pair comprising a first leg and a second leg, and a second leg pair comprising a third leg and a fourth leg, each of said legs having an inner side that faces toward a center of the support stand, and an opposing outer side that faces outwardly away from the center of the support stand;
  a first cross-rail spanning between the first and second legs of the first leg pair, said first cross-rail comprising a first rail stub attached to the inner side of the first leg, a second rail stub attached to the inner side of the second leg, and a first rail hub having first and second hollow cavities in which the first and second rail stubs are telescopically received at opposing ends of said first rail hub;
  a second cross-rail spanning between the third and fourth legs of the second leg pair, said second cross-rail comprising a third rail stub attached to the inner side of the third leg, a fourth rail stub attached to the inner side of the fourth leg, and a second rail hub having third and fourth hollow cavities in which the third and fourth rail stubs are telescopically received at opposing ends of said second rail hub; and
  at least one locking mechanism operable to selectively lock at least one of the cross-rails at any selected one of a plurality of user-selectable lengths to impart an overall user-selected width to at least one of the leg pairs.

According to a third aspect of the invention, there is provided an extendable collapsible rail assembly lockable at various lengths, said rail assembly comprising:
  an outer rail hub having a first hollow cavity opening thereinto at a first end of said outer rail hub;
  a first inner rail telescopically received in the said first hollow cavity of the outer rail hub for slidable movement back and forth therein to extend and collapse a distance by which said first inner rail extends from said first end of the outer rail hub; and
  a first locking mechanism that comprises a first lock slot penetrating through the first inner rail, and a first lock fastener penetrating through the first lock slot and engaged with opposing sidewalls of the outer rail hub on opposing sides of the first inner rail, said first lock fastener being selectively tightenable to force said opposing sidewalls of the outer rail together into clamped relation against said first inner rail at the opposing sides thereof to impart a hold thereon by which sliding extension or collapse of the first inner rail is resisted, and selectively loosenable to release said hold and allow said sliding extension or collapse of the first inner rail.

BRIEF DESCRIPTION OF THE DRAWINGS

Preferred embodiments of the invention will now be described in conjunction with the accompanying drawings in which.

DETAILED DESCRIPTION

Figure 1:
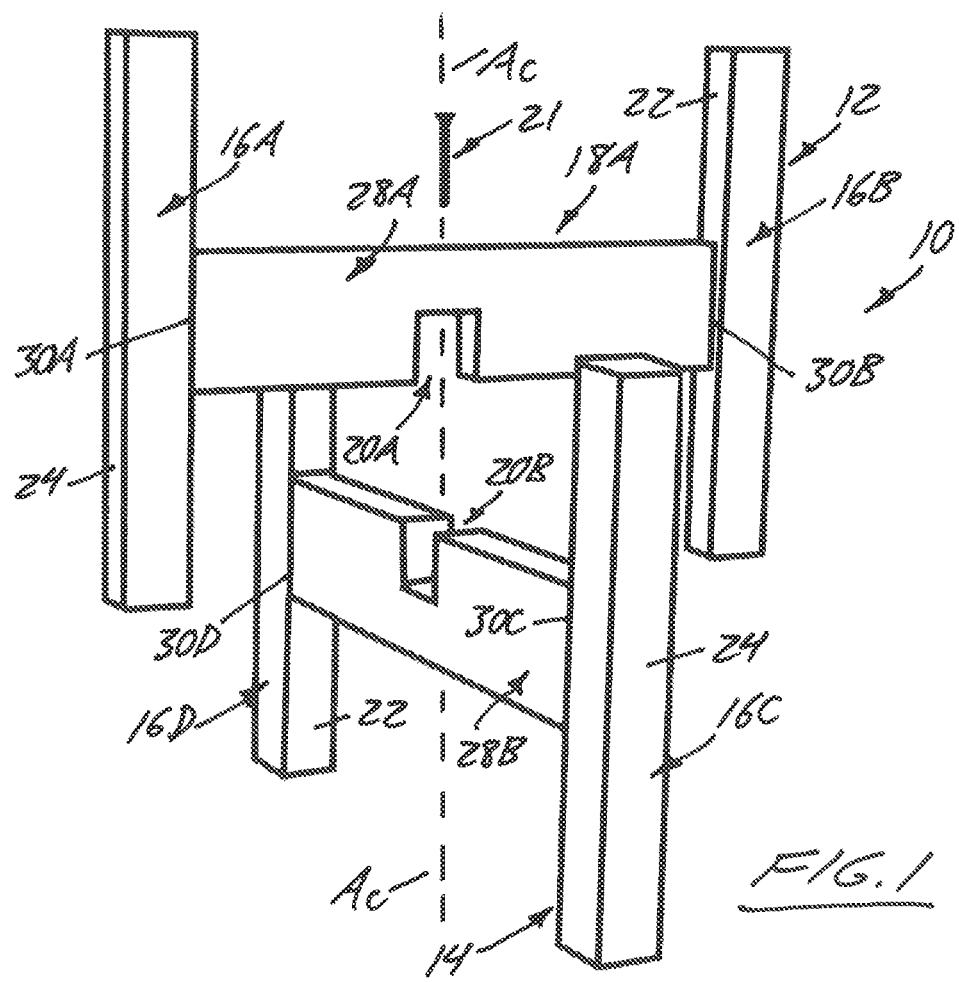
FIG. 1 is an exploded perspective view of a width-adjustable stand according to a first embodiment of the present invention, assembled from two leg pairs, each composed of two upright legs and an expandable/collapsible cross-rail spanning therebetween, and each being shown at its fully collapsed width.
Figure 2A:
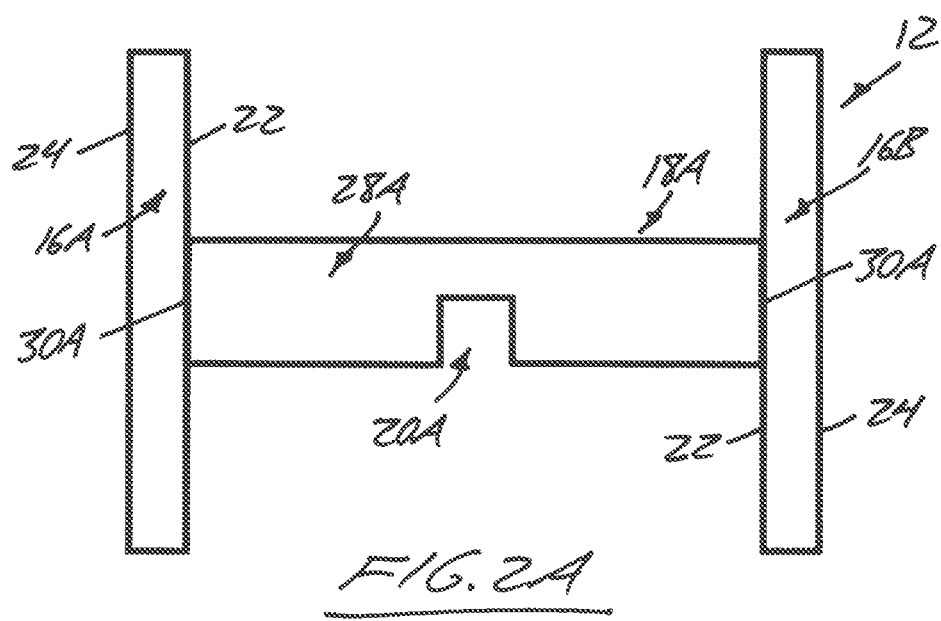
FIG. 2A is an isolated side perspective view of first one of the two leg pairs of FIG. 1 at its fully collapsed width.
Figure 2B:
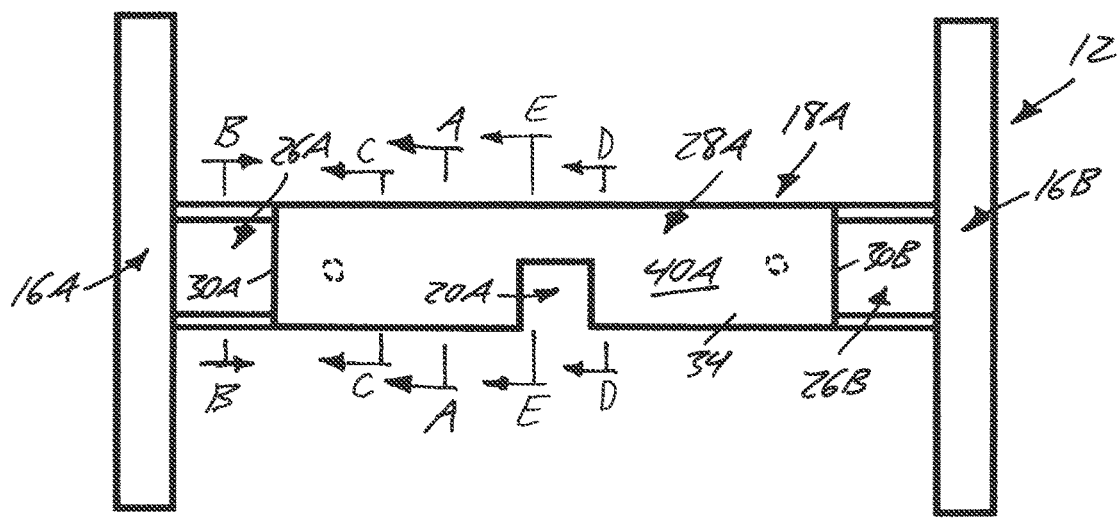
FIG. 2B is an isolated side perspective view of the same leg pair of FIG. 2A, but extended to a greater width.

FIG. 1 shows an exploded view of a first embodiment of a width-adjustable support stand 10 of the present invention, in an unassembled state. The stand 10 is composed of a first leg pair 12 and a second leg pair 14. Each leg pair features a pair of upright legs, and an expandable-collapsible cross-rail spanning between those two upright legs at an intermediate elevation between the top ends of the two legs and the opposing bottom ends thereof. The upright legs of first leg pair 12 are referred to herein as first and second legs 16A, 16B, between which a first cross-rail 18A extends horizontally, while the upright legs of second leg pair 14 are referred to herein as third and fourth legs 16C, 16D, between which a second cross-rail 18B extends horizontally. As illustrated, all four legs may be identical to one another, and the two cross-rails may be of identical construction, differing only in the inverted orientation relative to one another, whereby the first and second cross-rails 18A, 18B can be mated together via a first mid-slot 20A in the underside of the first cross-rail 18A and a matching second mid-slot 20B in the topside of the second cross-rail 18B. The respective mid-slots 20A, 20B of the two leg pairs 12, 14 denote respective centers thereof, and intersect at a center axis $A_c$ of the stand in the assembled state thereof, as shown in FIG. 1. The two leg pairs may be identical to one another with the cross-rails thereof mounted a mid-elevation on the legs, whereby the two identical leg pairs can be assembled simply by inverting one relative to the other.

Assembled together via mating of the aligned mid slots 20A, 20B, the two horizontal cross-rails 18A, 18B lie orthogonally of one another, with their respective topsides lying flush of one another in shared horizontal plane, thus cooperatively forming a cross-shaped support surface atop which a potted plant, pet food bowl, or other object may be placed in a supported position surrounded by the upper portions of the four upright legs (i.e. the portions thereof standing upright from the ends of the two mated cross-rails). As shown in FIG. 1, the two cross-rails 18A, 18B may be fastened together at the aligned mid-points thereof, for example by a threaded screw fastener 21 driven through the topside of the first cross-rail 18A into the floor of the second cross-rail's mid-slot 20B, or alternatively driven through the underside of the second cross-rail 18B into the ceiling of the first cross-rail's mid-slot 20A. A countersink bore may be provided in the topside of the first cross-rail 18A or the underside of the second cross-rail 18B so that the screwhead resides in recessed relation to the surface of the cross-rail.

Each of the four legs has an inner side 22 that faces toward a center of the support stand, and thus also facing toward the opposing leg of the same leg pair. An opposing outer side 24 of each leg faces outwardly away from the center of the support stand. The expandable/collapsible cross-rail of each leg pair is composed of multiple components of slidable relation to one another: a pair of rail stubs respectively attached to the two legs of the leg pair at the inner sides 22 thereof, and a central rail hub in which the two rail stubs are slidably received in telescopic fashion, whereby selective extension and retraction of the two rail stubs of either leg pair relative to the respective ends of the central rail hub of that leg pair can be used to expand and reduce a width of the support stand in a respective width direction spanned by the cross-rail of that leg pair.

So, referring to the drawings, the first cross-rail 18A is composed of a first rail stub 26A attached to the inner side 22 of the first leg 16A, a second rail stub 26B attached to the inner side 22 of the second leg 16B, and a first rail hub 28A having two opposing open ends 30A, 30B that face respectively toward the first and second legs 16A, 16B. Through the open ends 30A, 30B of the first rail hub 28A, the first and second rail stubs 26A, 26B are telescopically received in respective first and second hollow cavities inside the first rail hub 28A. The first such hollow cavity 32A is revealed in the cross-sectional view of FIG. 5A, of which the second hollow cavity would appear the same in such cross-section, and is thus not duplicated in the figures. Likewise, the second cross-rail 18B is composed of a third rail stub 26C attached to the inner side 24 of the third leg 16C, a fourth rail stub 26D attached to the inner side 24 of the fourth leg 16D, and a second rail hub 28B having two opposing open ends 30C, 30D that face respectively toward the third and fourth legs 16C, 16D. Through the open ends 30C, 30D of the second rail hub 28B, the third and fourth rail stubs 26C, 26D are telescopically received in respective third and fourth hollow cavities inside the second rail hub 28B, which would appear the same as the first hollow cavity 32A of FIG. 5A if likewise cross-sectioned, and are thus not duplicated in the figures.

Figure 3:
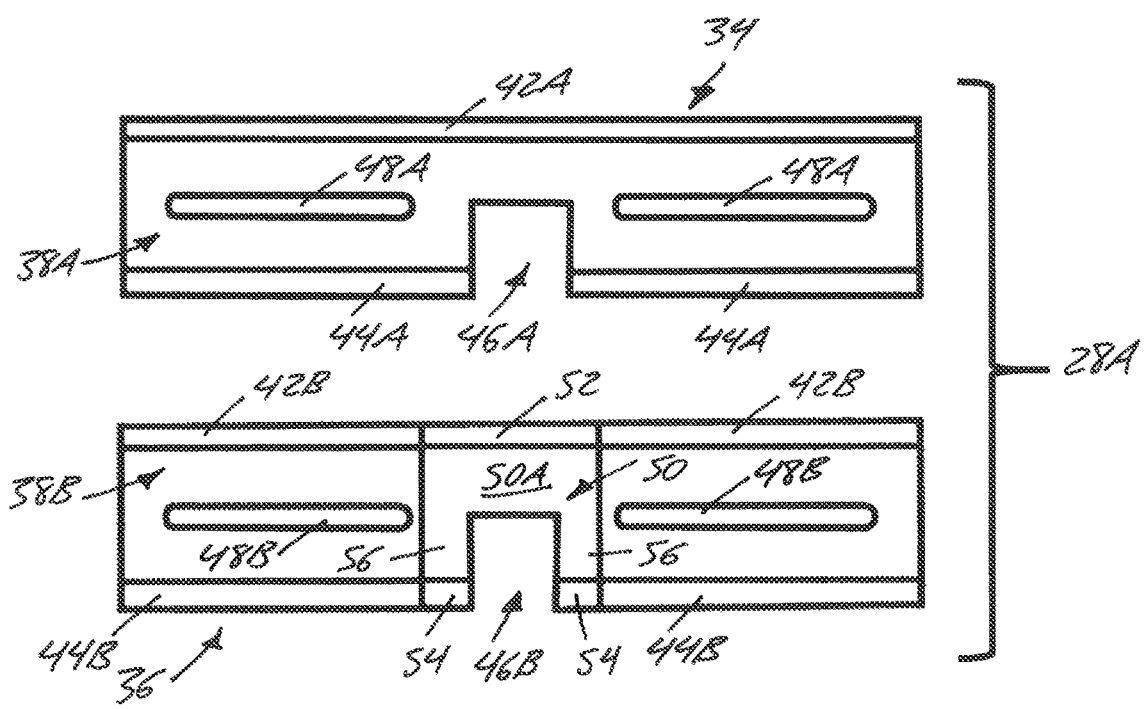
FIG. 3 illustrates two disassembled wall pieces of a rail hub of the same leg pair as FIGS. 2A and 2B, each being shown in side elevation from an inner side thereof.
Figure 4A:
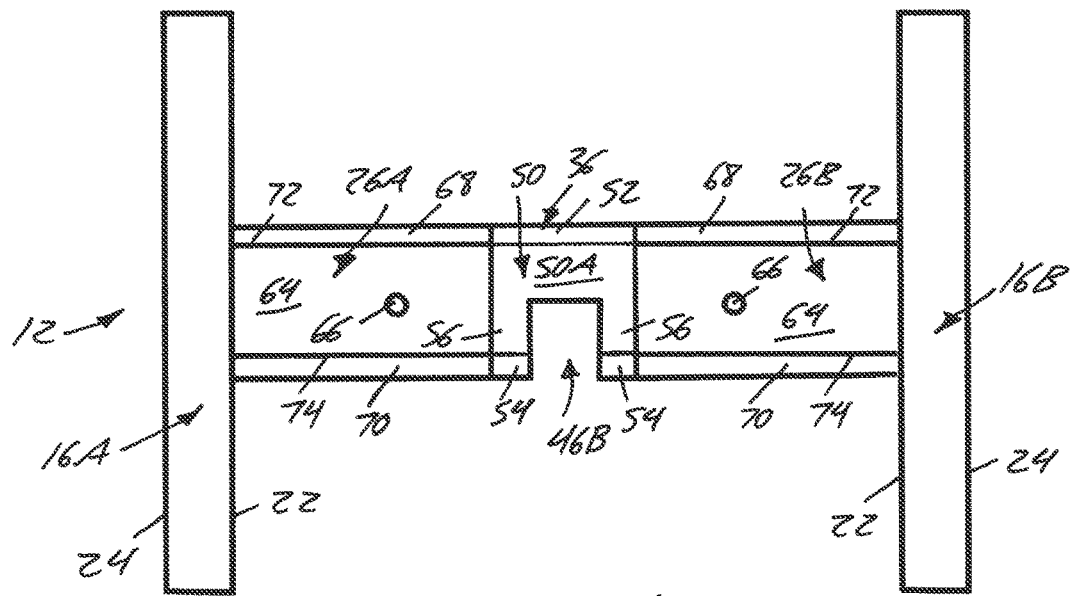
FIG. 4A is another isolated side elevational view of the same leg pair as FIG. 2A at its fully collapsed width, with one of the two wall pieces of the rail hub omitted for illustrative purpose.
Figure 4B:
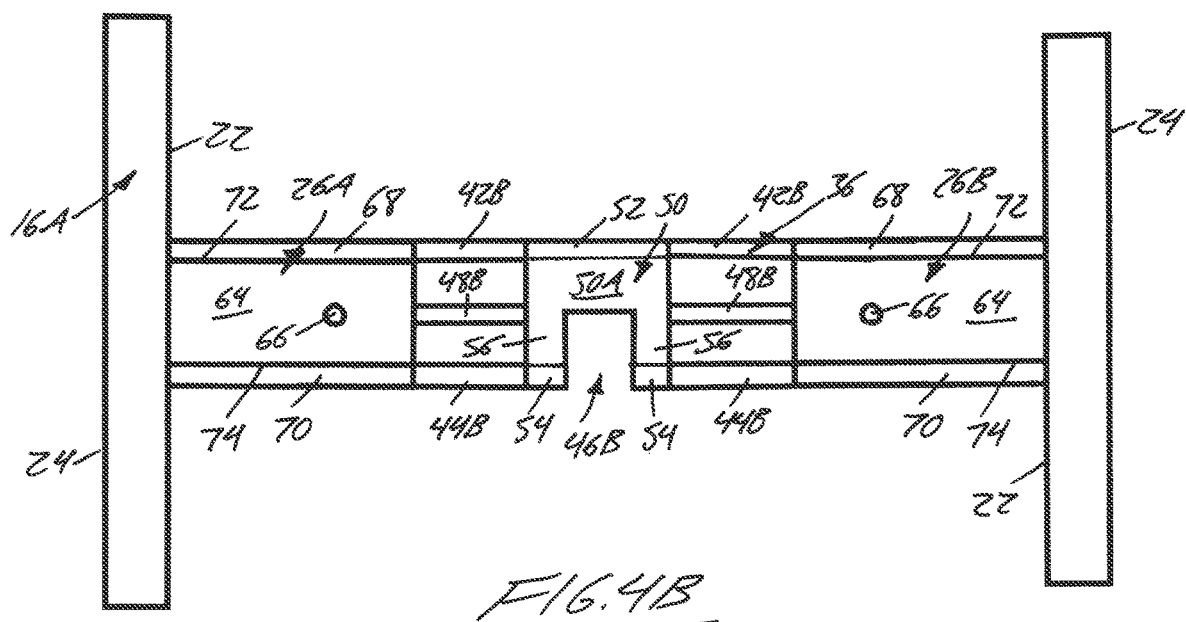
FIG. 4B is an isolated side elevational view of the same leg pair of FIG. 4A, but expanded to an extended width.

FIG. 3 illustrates a two-piece construction of the first rail hub 28A, of which the second rail hub 28B has an identical two-piece construction, but installed in an inverted orientation as mentioned above, and is thus not duplicated in the figures. Each rail hub is composed of a thinner wall piece 34, and a thicker wall piece 36. The thinner wall piece 34 is composed of an elongated rectangular wall 38A having a totally flat outer side 40A, and an opposing inner side with an in-turned top flange 42A running along a top edge of the wall 38, and a pair of in-turned bottom flanges 44A each running along a respective half of a bottom edge of the wall 36 on a respective side of a central rectangular cut-out 46A in the bottom edge. On each side of the rectangular cut-out 46A, the inner side of the wall 38A also has a respective guide slot 48A recessed therein that runs horizontally/longitudinally of the wall at an intermediate elevation between the in-turned top and bottom flanges 42A, 44A. The guide slots 48A stop short of the central cut-out 46A, and also stop short of the two opposing ends of the thinner wall piece. Except for the in-turned flanges 42A, 44A and the guide slots 48A, the inner side of the wall 38A is flat.

The thicker wall piece 36 likewise features an elongated rectangular wall 38B, which is of equal length and height to that of the thinner wall piece 34, and likewise has a central rectangular cut-out 46B at a midpoint of its bottom edge, a totally flat outer side 40B, and a flanged and slotted inner side of opposing relation thereto. The thicker piece 36 differs from the thinner wall piece 34 in that the inner side of the wall 38B also features a build-out 50 that protrudes therefrom on all three sides of the rectangular cut-out 46B. At this build-out 50, the thickness of the thicker wall piece 36 is greater than at all other areas thereof, of which said other areas are identical to their counterparts of the thinner wall piece 34 in the illustrated embodiments. Instead of a singular in-turned top flange 42A running the full length of the top edge, the inner side of the thicker wall piece 36 has two in-turned top flanges 42B each spanning from the central build-out 50 to a respective end of the piece 36. Like the thinner wall piece, the inner side of the thicker wall piece has two in-turned bottom flanges 44B each running from a respective end of the piece toward the central rectangular cut-out 46B, but this time stopping short thereof, and terminating at a respective side of the build-out 50.

A distal face 50A of the build-out 50 is flat, except at top edge thereof where a recessed upper shoulder 52 spans fully across the build-out 50 at matching elevation to the in-turned top flanges 42B, and at recessed lower shoulders 54 at respective bottom edges of two lower legs 56 of the build-out's distal face 50 that neighbour the cut-out 46B on opposing sides thereof. These recessed lower shoulders 54 reside at matching elevation to the in-turned bottom flanges 44B. The inner side of the thicker' piece's rectangular wall 38B has recessed guide slots 48B of matching and aligned relation to the two guide slots 48B in the inner side of the thinner piece 34.

Figures 5A, 5B, 5C:
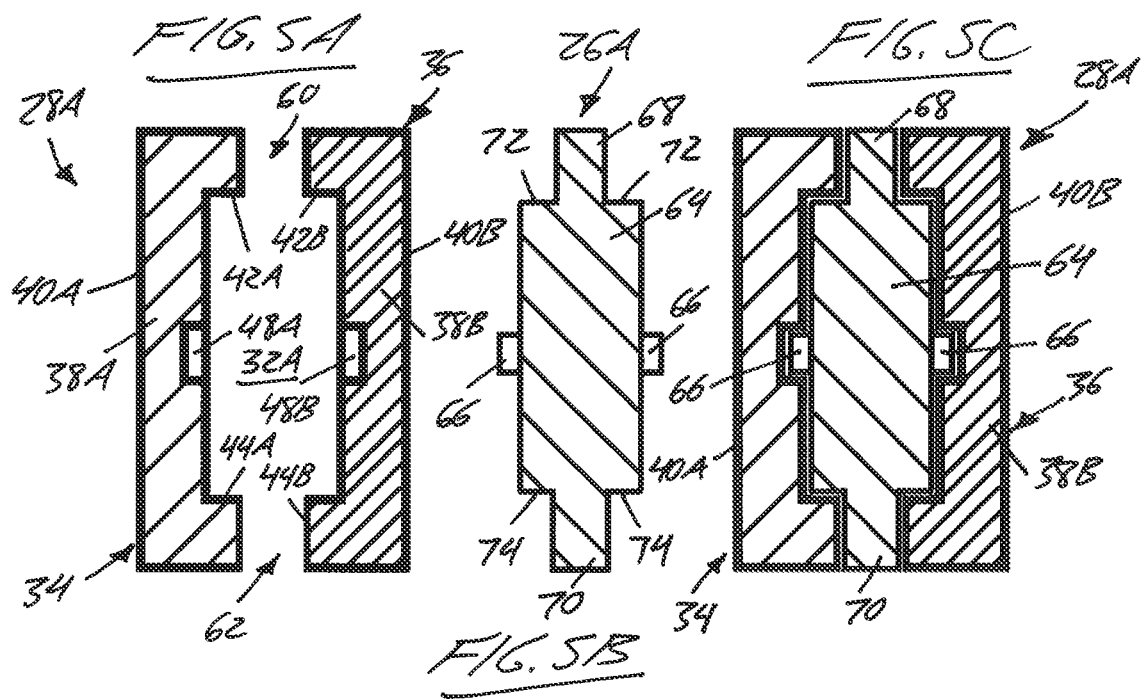
FIG. 5A is a cross-sectional view of the rail hub of the cross-rail of the leg pair of FIG. 2B, as taken at line A-A thereof.
FIG. 5B is a cross-sectional view of a rail stub of the cross-rail of the leg pair of FIG. 2B, as taken at line B-B thereof.
FIG. 5C is a cross-sectional view of the cross-rail of the leg pair of FIG. 2B, as taken at line C-C thereof.
Figures 5D, 5E:
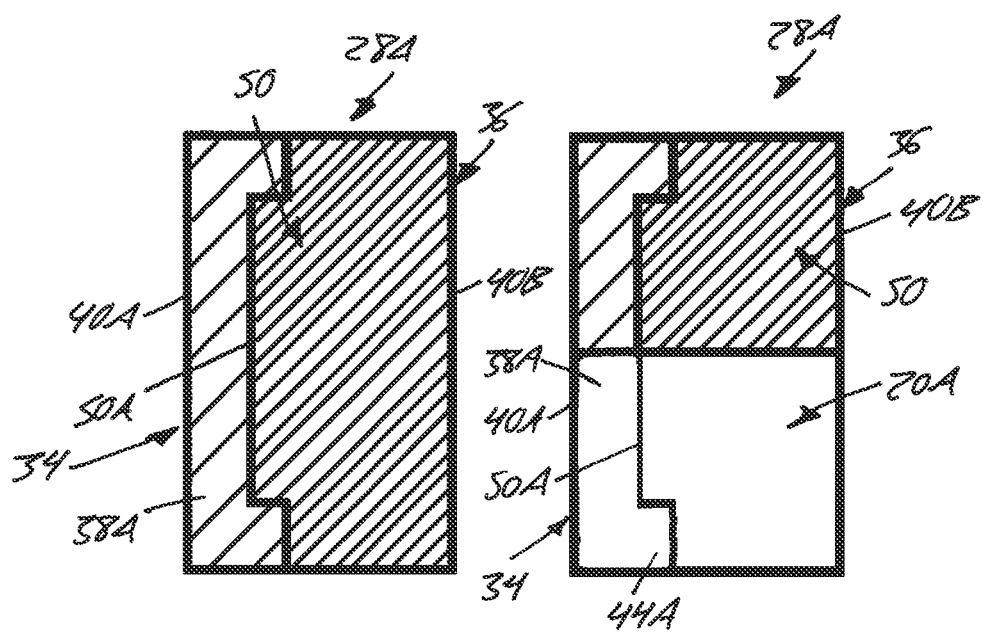
FIG. 5D is a cross-sectional view of the cross-rail of the leg pair of FIG. 2B, as taken at line D-D thereof.
FIG. 5E is a cross-sectional view of the cross-rail of the leg pair of FIG. 2B, as taken at line E-E thereof.
Figure 6A:
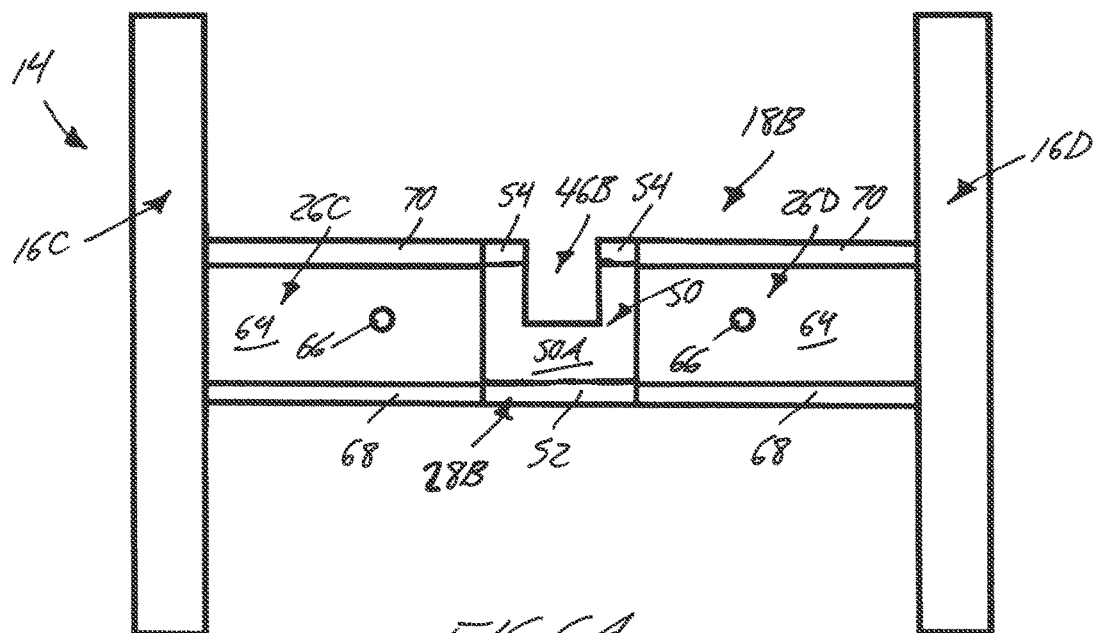
FIG. 6A is an isolated side elevational view of the second leg pair of the first embodiment at its fully collapsed width, with one of the two wall pieces of the rail hub omitted for illustrative purpose.
Figure 6B:
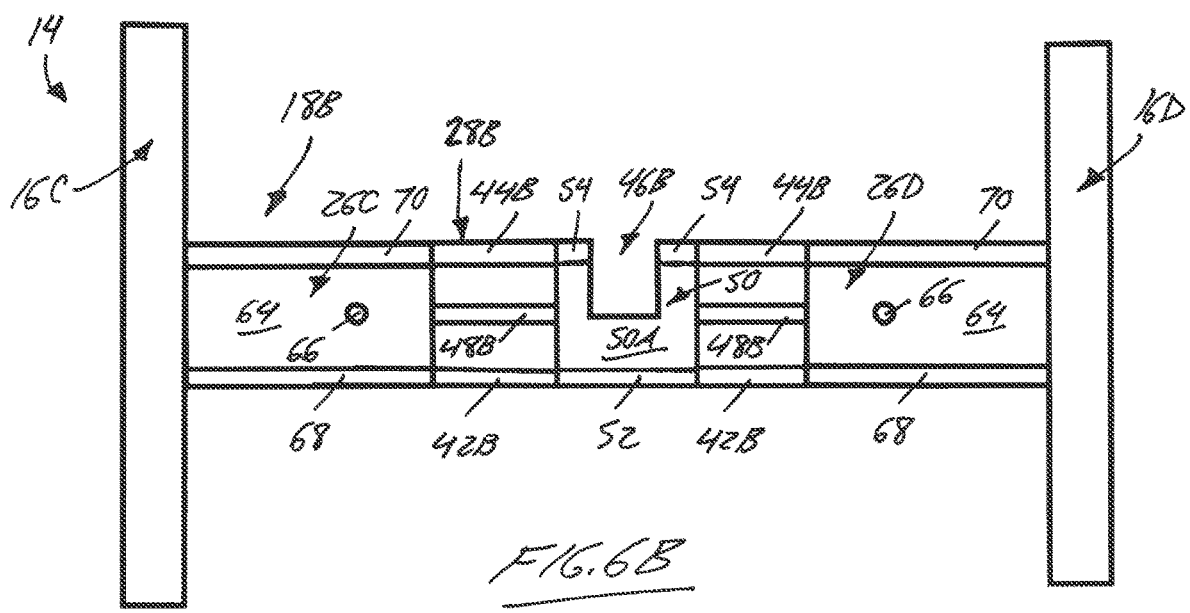
FIG. 6B is an isolated side elevational view of the same leg pair of FIG. 6A, but expanded to an extended width.
Figure 7:
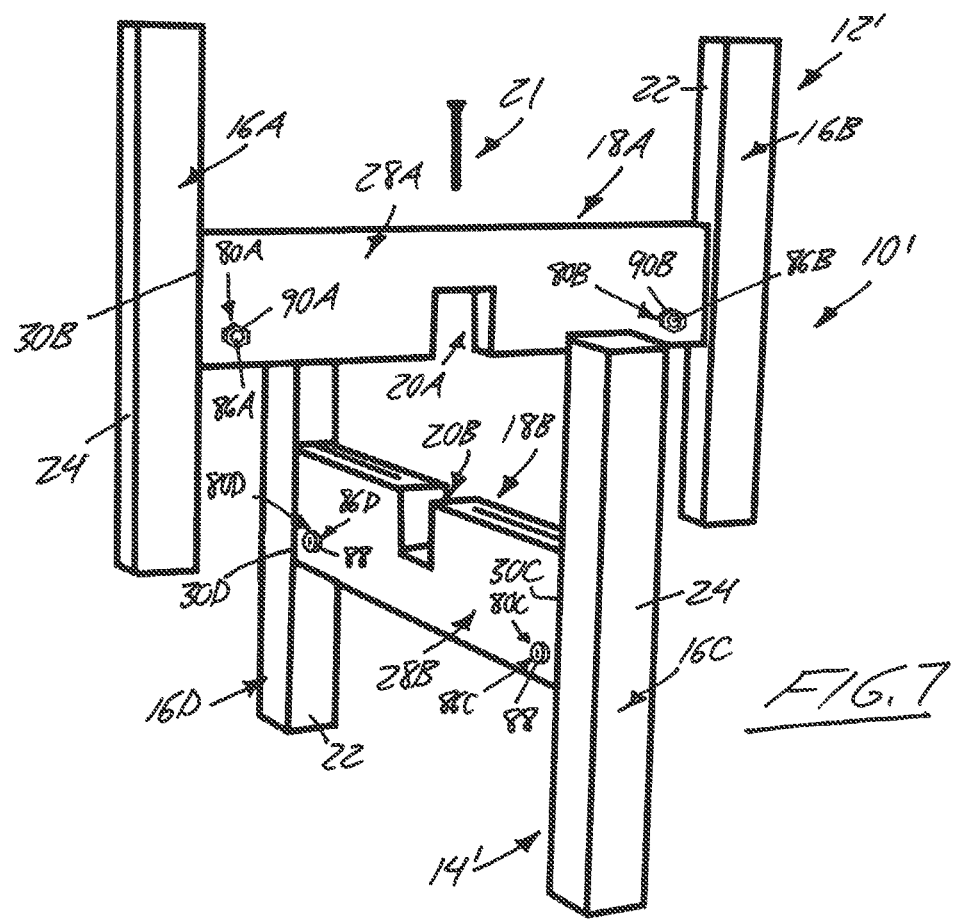
FIG. 7 is an exploded perspective view of a width-adjustable stand according to a second embodiment of the present invention, which differs from the first embodiment only in the addition of a locking mechanism to each leg pair to enable locking thereof at any user-selected width.
Figure 8A:
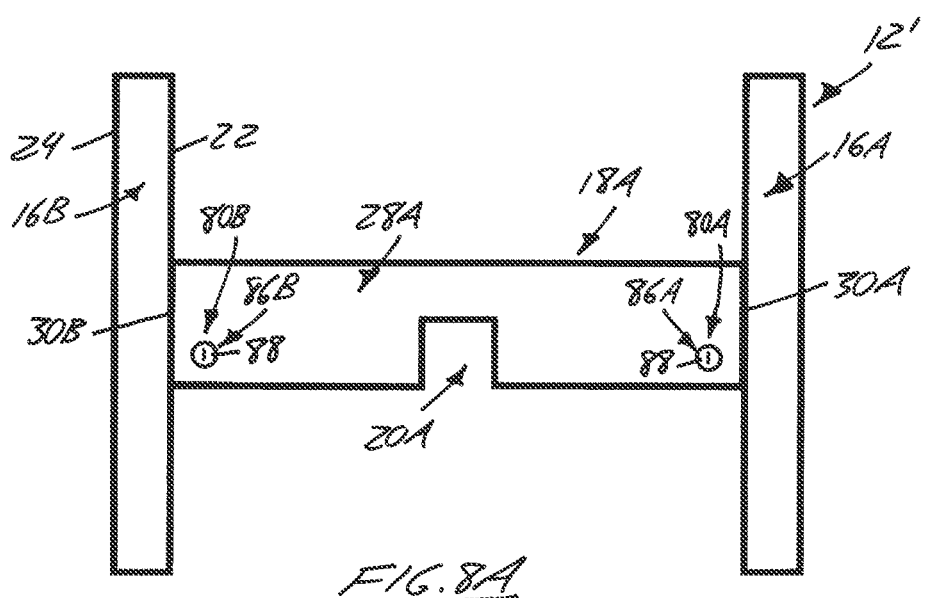
FIG. 8A is an isolated side perspective view of first one of the two leg pairs of FIG. 7 at its fully collapsed width.
Figure 8B:
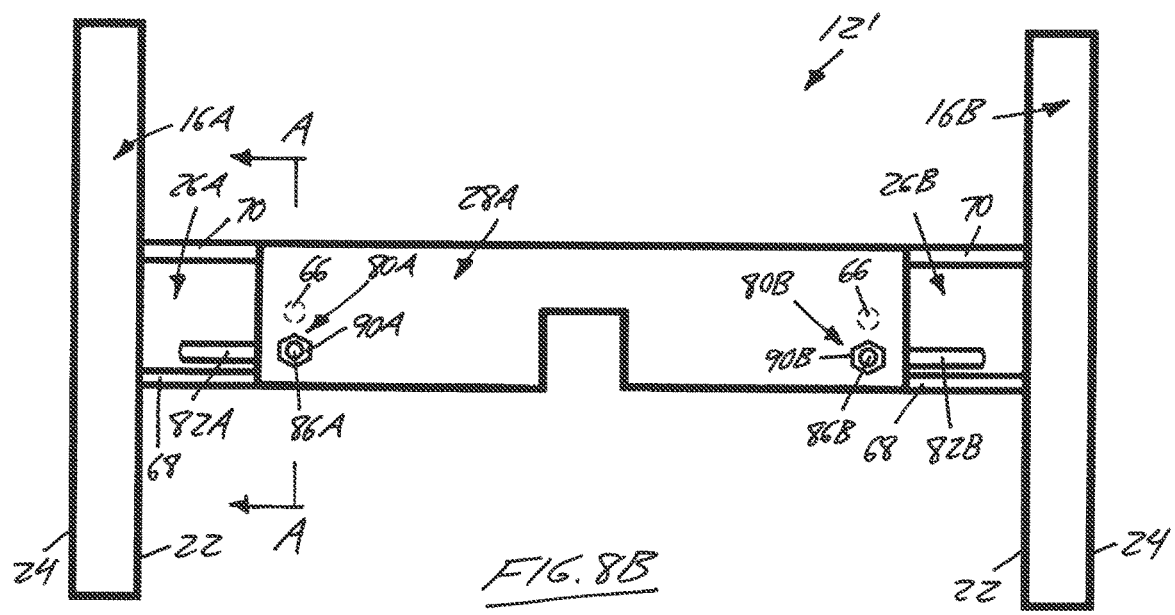
FIG. 8B is an isolated side perspective view of the same leg pair of FIG. 8A, but from an opposing side thereof and extended to a greater width.
Figure 9:
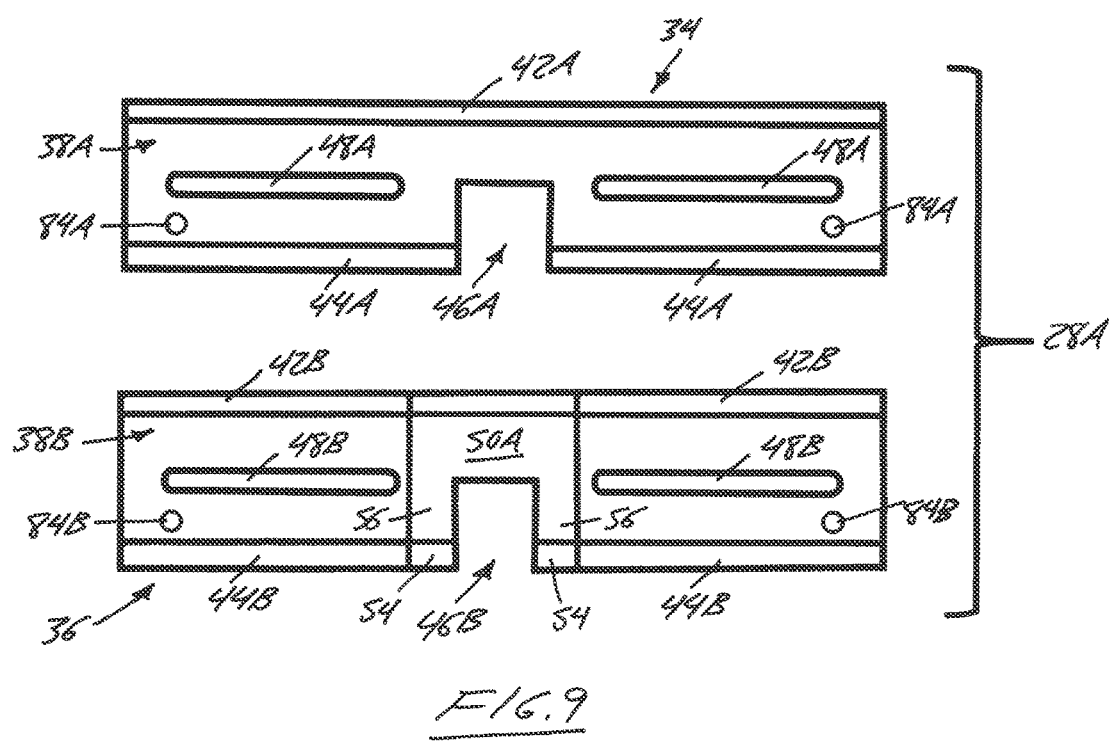
FIG. 9 illustrates two disassembled wall pieces of the rail hub of the same leg pair as FIGS. 8A and 8B, each being shown in side elevation from an inner side thereof.

The two pieces 34, 36 of the rail hub are assembled together with their flanged and slotted inner sides facing toward one another, in mated fashion such that the distal face 50A of the build-out 50 on the thicker piece fits against the inner side of the thinner piece's rectangular wall 38A at the unflanged area thereof around the central cut-out 46A. Meanwhile, a mid-portion of the thinner piece's top flange 42A fits in the recessed upper shoulder 52 of the build-out 50, and an end-portion of each of the thinner piece's bottom flanges 44A fits in a respective one of the recessed bottom shoulders 54 the build-out's lower legs 56. The two pieces are secured together at their mated-together central regions where the distal face 50A of the build-out 50 of the thicker piece abuts against the wall 38A of the thinner piece, as best shown in the cross-sectional views of FIGS. 5D and 5E. Such securement may be achieved, for example, using adhesive, nails, screw fasteners, or any combination thereof. The two aligned rectangular cut-outs 46A, 46B of the assembled together wall pieces 34, 36 of the rail hub cooperatively form the respective mid-slot 20A thereof. FIG. 5A shows one of the hollow cavities 32A of the assembled two-piece rail hub 28A, where the hollow cavity 32A is bound between the slotted inner sides of the rectangular walls 38, 38B of the two wall pieces 34, 36.

The build-out 50 serves to space the two rectangular walls 38A, 38B apart from one another by distance exceeding the combined protruding distances of the in-turned top flanges 42A, 42B of the two wall pieces 34, 36, and likewise exceeding the combined protruding distances of the in-turned bottom flanges 44A, 44B of the two wall pieces 34, 36. This way, each of the two hollow cavities of each rail hub 28A, 28B has an open upper slot 60 left between the in-turned top flange 42A of the thinner piece 34 and one of the in-turned top flanges 42B of the thicker piece 36, and an open lower slot 62 is likewise left between an aligned pair of the bottom flanges 44A, 44B of the thicker and thinner pieces 34, 36. So, on each side of the mated-together central regions of the two wall pieces 34, 36, each rail hub 28A, 28B has a hollow cavity of rectangular shape bound between the two walls 38A, 38B, an open upper slot 60 that opens into the cavity at a topside of the rail hub 18A, 18B and an open lower slot 62 that opens into the cavity at an underside of the rail hub hub 18A, 18B. Each cavity and its top and bottom slots 60, 62 are open at the respective end 30A, 30B, 30C, 30d of the rail hub 28A, 28B, and each cavity and its top and bottom slots 60, 62 terminate at a respective side of the central build-out 50 and mating wall 38A at the central region of the assembled rail hub 28A, 28B.

In the forgoing description of the two-piece rail hub construction, the terms top and bottom are used in relation to the illustrated orientation of the first cross-rail 18A, and would be reversed for the second cross-rail 18B, for which corresponding description of its identical two-piece construction is omitted in the in the interest of brevity.

Each rail stub 26A-26D comprises a rectangular body 64 whose cross-sectional width and height are slightly lesser than those possessed by each of the hollow cavities of the rail hubs 18A, 18B, as best seen in the cross-sectional view of FIG. 5C. On opposing side faces of the rectangular body 64, each rail stub 26A-26D has a pair of protruding male studs 66 at an intermediate elevation thereon that corresponds to, and aligns with, the elevation of the female guide slots 48A, 48B in the two walls of the respective cavity of the rail hub 28A, 28B, so that in the assembled state of the cross-rail, each male stud 66 is received in a respective guide slot 48A, 48B for sliding movement back and forth therein during extension and retraction of the rail stub further out of, and further back into, the rail hub 28A, 28B. An upper male tongue 68 runs along a top edge of the rectangular body 64 of each rail stub, and has lesser cross-sectional width relative thereto, which is sized to slidably fit within the open upper slot 60 of the cavity, as seen in FIG. 5C. Likewise, a lower male tongue 70 runs along a bottom edge of the rectangular body 64 of each rail stub, and has lesser cross-sectional width relative thereto, which is sized to slidably fit within the open lower slot 62 of the cavity, as also seen in FIG. 5C. Referring to the same figure, it can be seen how the in-turned top flanges 42A, 42B of the rail hub 18A, 18B jut inwardly overtop of upper shoulders 72 of the rail stub body 64 on opposing sides of the rail stub's upper tongue 68. Likewise, the in-turned bottom flanges 44A, 44B of the rail hub 18A, 18B jut inwardly beneath lower shoulders 74 of the rail stub body 64 on opposing sides of the rail stub's lower tongue 70.

Accordingly, the linear sliding of each rail stub 26A-26D within the respective hollow cavity of the rail hub 28A, 28B is constrained not solely by the male studs 66 engaged in the guide slots 48A, 48B, but rather by a cooperative combination of this stud/slot engagement with the additional tongue-slot engagements at the top and bottom of the hollow cavity. This provides a more robust design of the slidingly expand-able/collapsible cross-rail 18A, 18B compared to the prior art that relied solely on the stud and slot engagement on laterally opposing sides of the rail studs, which were prone to breakage of such studs in a manner rendering the cross-rail inoperable. It will be that while the illustrated embodiments use male studs 66 on the rail stubs 26A-26D and corresponding female slots 48A, 48B in the walls 38A, 38B of the rail hubs 28A, 28B to define cooperating slide guides, it will be appreciated that this layout may optionally be reversed, with the female slots being located on opposing sides of the rail stubs, and the protruding male studs being located on the inner sides of the rail hub walls.

FIGS. 7 through 12 illustrate a second embodiment of the width-adjustable support stand 10', which includes all of the same features described and illustrated for the first embodiment, plus the addition of novel locking mechanisms by which the two rail stubs of each leg pair are each selectively at any user-selected degree of extension or retraction relative thereto, whereby a user can selectively lock each leg pair at any user-selected width. Each leg pair 12, 14 has a respective locking mechanism, featuring two matching locks, one for each of the leg pair's two rail stubs.

Accordingly, first leg pair 12' has first and second locks 80A, 80B for the first and second rail stubs 26A, 26B, respectively, and second leg pair 14' has third and fourth locks 80C, 80C for the third and fourth rail stubs 26C, 26D, respectively. Each lock 80A, 80B, 80C, 80D features a respective lock slot 82A, 82B, 82C, 82D that runs horizontally/longitudinally of the respective rail stub 26A, 26B, 26C, 26D, and thus in parallel relation to the guide slots 48A, 48B of the corresponding rail hub 28A, 28B, at an elevation somewhere between the tongues 68, 70 of the rail stub. In the illustrated example, each lock slot 82A, 82B, 82C, 82D resides at an elevation below the male stud 66 of the rail stub, and thus closer to the lower tongue 68 thereof than to the upper tongue 70 thereof, though this need not necessarily be the case, and the lock slot may instead reside at an elevation above the male stud 66 and closer to the upper tongue 70. Each lock slot 82A, 82B, 82C, 82D is a through-slot that penetrates fully through the respective rail stub 26A, 26B, 26C, 26D from one side thereof to the other, unlike the recessed guide slots 48A, 48B that do not fully penetrate the walls 38A, 38B of the rail hubs 28A, 28B. Each lock 80A, 80B, 80C, 80D also features a pair of matching lock holes 84A, 84B respectively provided in the two walls 38A, 38B of the rail hub 28A, 28B at positions aligned with the outer ends of the respective guide slots 48A, 48B therein (i.e. the ends of the guide slots 48A, 48B nearest to the ends 30A, 30B, 30C, 30D of the rail hubs 28A, 28B). The lock holes 84A, 84B of each lock 80A, 80B, 80C, 80D reside at matching elevation to the respective lock slot 82A, 82B, 82C, 82D thereof. Each lock also features a threaded male lock fastener (e.g. screw or bolt) 86A, 86B, 86C, 86D whose threaded shaft penetrates through the aligned pair of lock holes 84A, 84B, and in doing so, also penetrates through the respective lock slot 82A, 82B, 82C, 82D. A head 88 of each lock fastener thus engages against the flat outer side 40B of one of the rail hub walls 38B.

Each lock also features a threaded female nut 90A, 90B, 90C, 90D affixed to the flat outer side 40A of the other one of the hub rail walls 38A in alignment with the respective lock hole 84A therein, whereby the threaded shaft of the male lock fastener 86A, 86B, 86C, 86D is threadingly engaged with the threaded bore of this female nut 90A, 90B, 90C, 90D. The illustrated embodiment relying on affixation of a separate nut 90A, 90B, 90C, 90D to provide a fastener-engageable bore on one of the two rail hub walls 38A may, in one non-limiting example, be one in which the rail hub, rail stubs and legs are of wooden composition. In other cases, for example employing metal other non-wooden construction for the rail hub, a female threaded bore may alternatively be integrated directly into the rail hub wall itself.

Tightening of the threaded male lock fastener 86A, 86B, 86C, 86D of any one of the locks 80A, 80B, 80C, 80D via tool driven rotation of the fastener's head 88 in a direction advancing the fastener further into the threaded bore of the respective female nut 90A, 90B, 90C, 90D serves to force the two opposing walls 38A, 38B of the rail hub closer together. With sufficient tightening, this brings the two rail hub walls 38A, 38B into clamped condition against the two opposing sides of the respective rail stub 26A, 26B, 26C, 26D, thus frictionally holding the rail stub against sliding movement in either of its extending or retracting directions relative to the rail hub 28A, 28B. Accordingly, such tightening of the two lock fasteners on either leg pair is operable to thereby frictionally lock the cross-rail at any user selected length, thereby locking said leg pair at a corresponding user-selected width. Loosening of the male lock fastener 86A, 86B, 86C, 86D, via tool driven rotation of its head 88 in a reverse direction retreating the male lock fastener from the threaded bore of the respective female nut thereby releases the frictionally clamped hold of the respective rail stub 26A, 26B, 26C, 26D between the opposing walls 38A, 38B of the rail hub 28A, 28B, whereafter the rail stub is once again freely slidable back and forth in the rail hub 28A, 28B to adjust the width of the leg pair. During such sliding adjustment, the threaded shaft of the lock fastener 86A, 86B, 86C, 86D can slide freely back and forth in the respective lock slot 82A, 82B, 82C, 82D.

Figure 10A:
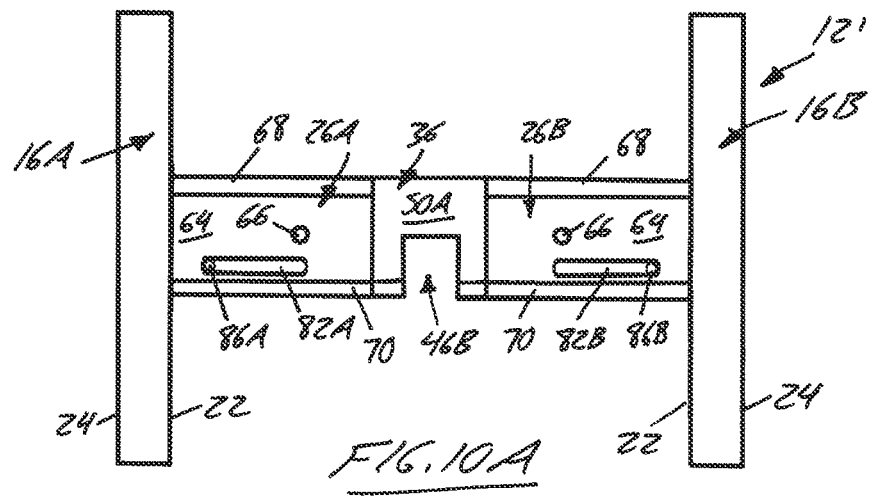
FIG. 10A is another isolated side elevational view of the same leg pair as FIG. 8A at its fully collapsed width, with one of the two wall pieces of the rail hub omitted for illustrative purpose.
Figure 10B:
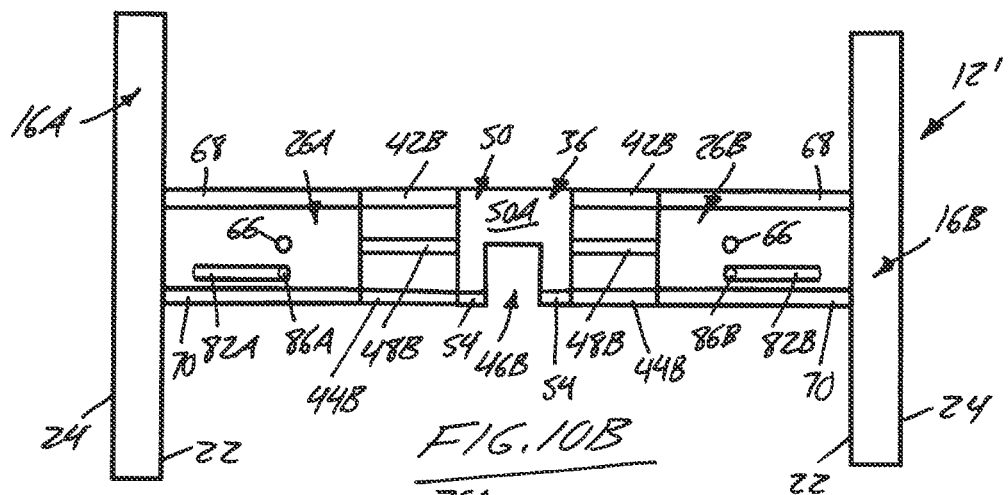
FIG. 10B is an isolated side elevational view of the same leg pair of FIG. 10A, but expanded to an extended width.
Figure 11:
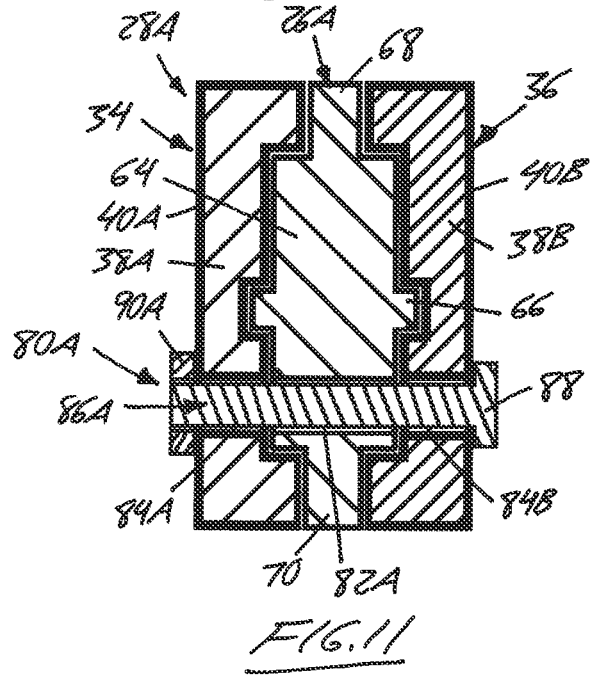
FIG. 11 is a cross-sectional view of the rail hub of the cross-rail of the leg pair of FIG. 8B, as taken at line A-A thereof.
Figure 12A:
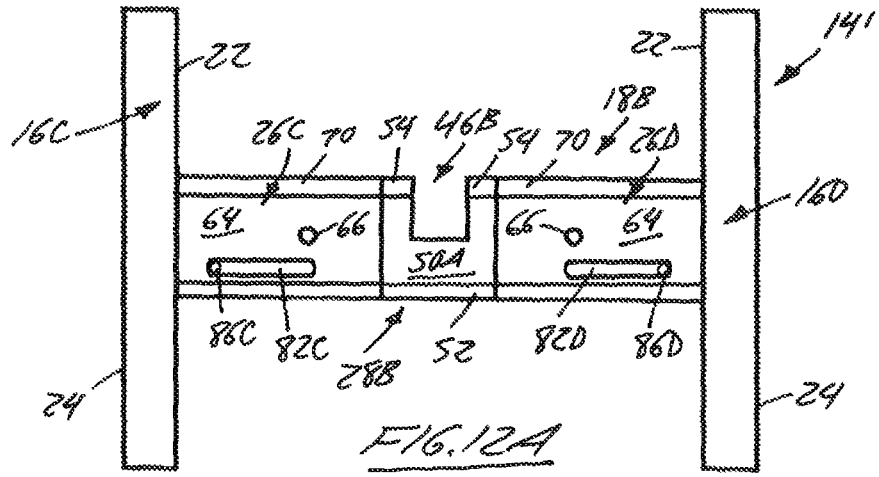
FIG. 12A is an isolated side elevational view of the second leg pair of the second embodiment at its fully collapsed width, with one of the two wall pieces of the rail hub omitted for illustrative purpose.
Figure 12B:
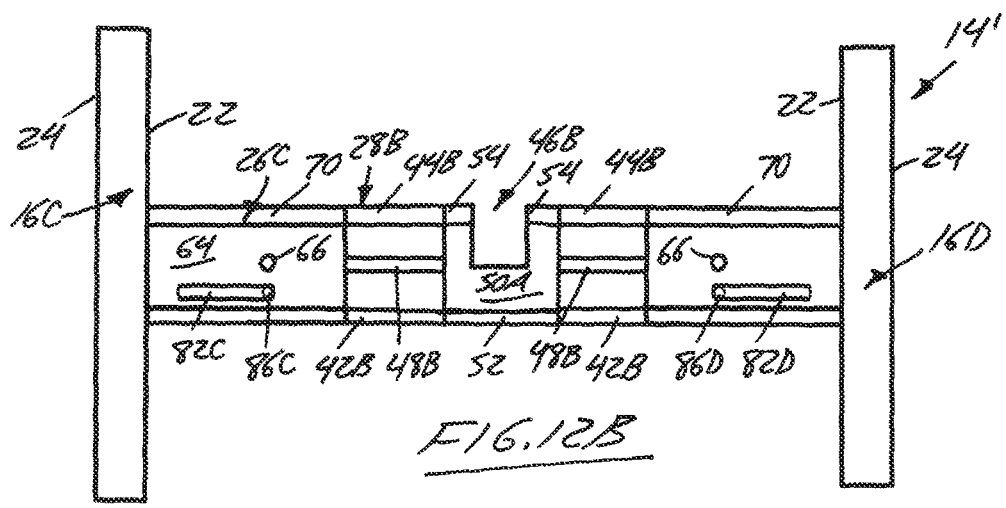
FIG. 12B is an isolated side elevational view of the same leg pair of FIG. 12A, but expanded to an extended width.
Figure 12C:
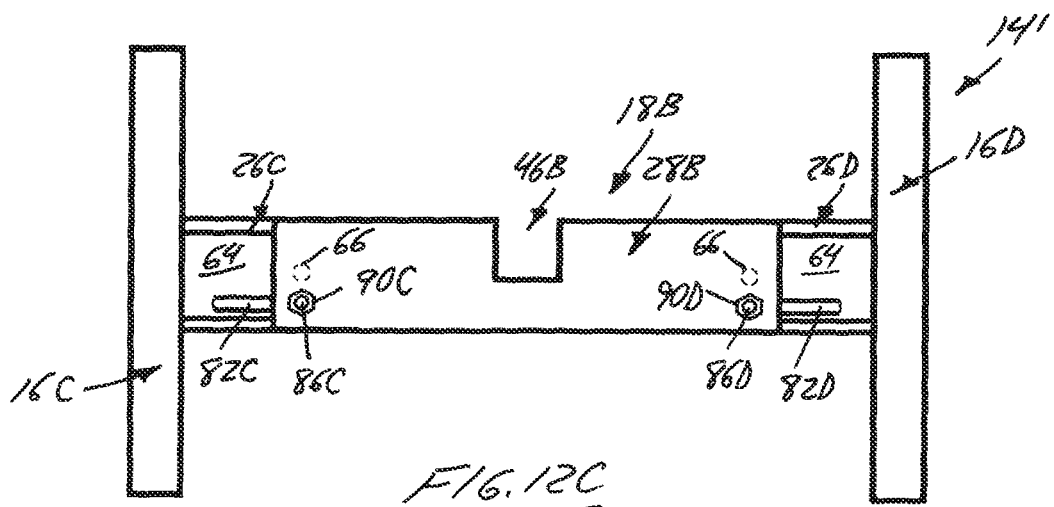
FIG. 12C is another isolated side elevational of the leg pair of FIG. 12B, but with the previously omitted wall piece of the rail hub shown intact.

In the illustrated embodiment, the distance from the inner side 22 each leg 16A, 16B, 16C, 16D to the nearest end of the respective lock slot 82A, 82B, 82C, 82D of that leg's rail stub 26A, 26B, 26C, 26D is equal to the distance from each lock hole 84A, 84B to the nearest end 30A, 30B, 30C, 30D of the rail hub 28A, 28B in which that lock hole 84A, 84B is found. Accordingly, when each rail stub is fully retracted into the respective rail hub cavity, thereby bringing the respective leg's inner side 22 into abutting contact with the respective rail hub end 30A, 30B, 30C, 30D, the respective lock fastener 86A, 86B, 86C, 86D occupies the outer end of the respective lock slot 82A, 82B, 82C, 82D, as shown in FIGS. 10A and 12A. In the illustrated embodiment, each pair of lock holes 84A, 84B aligns with the outer end of the respective pair of guide slots 48A, 48B, and the inner end of each lock slot 82A, 82B, 82C, 82D aligns with the male studs 66 of the respective rail stub 26A, 26B, 26C, 26D. Accordingly, in the fully extended state of each rail stub, the respective lock fastener 86A, 86B, 86C, 86D occupies the inner end of the respective lock slot 82A, 82B, 82C, 82D, as shown in FIGS. 10B and 12B, which coincides with occupation of the outer ends of the respective pair of guide slots 48A, 48B with the rail stub's respective male studs 66. So, as long as the lock fastener is not removed entirely, it serves as a redundant stop that, like the male studs 66, limits the maximum allowable extension of the rail stub thereof from the rail hub.

It will be appreciated that a lock of this same type may be used for the same selective locking of an inner rail component (akin to the rail stub of the illustrated support stand examples), relative to an outer rail hub in which that inner rail component is telescopically received, regardless of whether there are two such inner rail components (akin to the two rail stubs of a leg pair, in the support stand context of the illustrated embodiments) telescopically received in respective hollow cavities of the rail hub at opposing ends thereof, or only one such inner rail, and regardless of whether the resulting extendible, collapsible lockable rail assembly is particularly used in the illustrated context of a width-adjustable support stand, or any other context where a length-adjustable rail lockable at user-selected lengths may be useful.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A width-adjustable support stand comprising:
a first leg pair comprising a first leg and a second leg, and a second leg pair comprising a third leg and a fourth leg, each of the said legs having an inner side that faces toward a center axis of the support stand, wherein a center of the first leg pair and a center of the second leg pair are intersect at the center axis of the stand, and an opposing outer side that faces outwardly away from the center axis of the support stand;
a first cross-rail spanning between the first and second legs of the first leg pair, said first cross-rail comprising a first rail stub attached to the inner side of the first leg, a second rail stub attached to the inner side of the second leg, and a first rail hub having first and second hollow cavities in which the first and second rail stubs are telescopically received at opposing ends of said first rail hub;
a second cross-rail spanning between the third and fourth legs of the second leg pair, said second cross-rail comprising a third rail stub attached to the inner side of the third leg, a fourth rail stub attached to the inner side of the fourth leg, and a second rail hub having third and fourth hollow cavities in which the third and fourth rail stubs are telescopically received at opposing ends of said second rail hub;
wherein each rail stub has a pair of slide guides on opposing sides thereof that respectively engage with a corresponding pair of slide guides on opposing internal walls of the respective hollow cavity, each rail stub has an upper male tongue running along a topside of the rail stub and a lower male tongue running along an underside of the rail stub, the upper male tongue of each one of the rail stubs is received in an open upper slot of one of the rail hubs that runs along a topside thereof between a pair of in-turned top flanges of said one of the rail hubs, and the lower male tongue of said each one of the rail stubs is received in an open lower slot of said one of the rail hubs that runs along an underside thereof between a pair of in-turned bottom flanges of said one of the rail hubs.

2. The support stand of claim 1 wherein the slide guides on each rail stub comprise protruding male slide guides, and the corresponding slide guides on the opposing internal walls of each hollow cavity are female slide guides in which the male slide guides are slidably received.

3. The support stand of claim 1 wherein the first leg pair comprises a first locking mechanism operable to selectively lock the first cross-rail at any one of a plurality of user-selectable lengths, each imparting a different overall width to the first leg pair.

4. The support stand of claim 3 wherein the second leg pair comprises a second locking mechanism operable to lock the second cross-rail at any one of a plurality of user-selectable lengths, each imparting a different overall width to the second leg pair.

5. The support stand of claim 4 wherein the first and second locking mechanisms are of matching configuration to one another.

6. The support stand of claim 3 wherein the first locking mechanism comprises a first lock slot penetrating through the first rail stub, a first lock fastener penetrating through the first lock slot and engaged with opposing sidewalls of the first rail hub on opposing sides of the first rail stub.

7. The support stand of claim 6 wherein the first locking mechanism further comprises a second lock slot penetrating through the second rail stub, and a second lock fastener penetrating through the second lock slot and engaged with said opposing side walls of the first rail hub on opposing sides of the second rail stub.

8. The support stand of claim 7 wherein the second leg pair comprises a second locking mechanism operable to selectively lock the second cross-rail at any one of a plurality of user-selectable lengths, each imparting a different overall width to the second leg pair, and said second locking mechanism comprises a third lock slot penetrating through the third rail stub, a fourth lock slot penetrating through the fourth rail stub, a third lock fastener penetrating through the third lock slot and engaged with opposing sidewalls of the second rail hub on opposing sides of the third rail stub, and a fourth lock fastener penetrating through the fourth lock slot and engaged with said opposing side walls of the second rail hub on opposing sides of the fourth rail stub.

9. The support stand of claim 6 wherein the second leg pair comprises a second locking mechanism operable to selectively lock the second cross-rail at any one of a plurality of user-selectable lengths, each imparting a different overall width to the second leg pair, and said second locking mechanism comprises a third lock slot penetrating through the third rail stub, and a third lock fastener penetrating through the third lock slot and engaged with opposing sidewalls of the second rail hub on opposing sides of the third rail stub.

\* \* \* \* \*